United States Patent
Tsai et al.

(10) Patent No.: US 10,745,556 B1
(45) Date of Patent: Aug. 18, 2020

(54) AMINO RESIN COMPOSITION AND VARNISH, COATING LAYER, AND PRODUCT COMPRISING THE SAME

(71) Applicant: Chang Chun Plastics Co., Ltd., Taipei (TW)

(72) Inventors: Ren-Wei Tsai, Taipei (TW); You-Ting Chen, Taipei (TW); Kuo-Pin Wu, Taipei (TW); Yung-Sheng Lin, Taipei (TW); I-Chiang Lai, Taipei (TW); Yi-Sern Wong, Taipei (TW); Kuen-Yuan Hwang, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 16/824,000

(22) Filed: Mar. 19, 2020

(30) Foreign Application Priority Data

Jan. 17, 2020 (TW) .................................. 109101793

(51) Int. Cl.
*C08L 75/02* (2006.01)
*C09D 7/40* (2018.01)
*C09D 175/02* (2006.01)

(52) U.S. Cl.
CPC ................ *C08L 75/02* (2013.01); *C09D 7/40* (2018.01); *C09D 175/02* (2013.01)

(58) Field of Classification Search
CPC .... C09D 161/32; C08G 12/36; D06M 15/423
See application file for complete search history.

(56) References Cited

U.S. PATENT DOCUMENTS

| | | | | |
|---|---|---|---|---|
| 3,590,100 A * | 6/1971 | Weiland | ............... | C07D 233/32 524/598 |
| 4,300,898 A * | 11/1981 | North | ................... | D06M 15/423 528/245 |
| 4,345,063 A * | 8/1982 | North | ...................... | C08G 12/26 528/245 |
| 4,623,356 A * | 11/1986 | Hendrix | .................. | D06C 3/02 8/107 |
| 2013/0189442 A1* | 7/2013 | Gupta | .................... | C08G 12/36 427/458 |
| 2018/0346647 A1* | 12/2018 | Treasurer | ............... | C08G 12/26 |

* cited by examiner

*Primary Examiner* — Michael M Dollinger
(74) *Attorney, Agent, or Firm* — WPAT, PC

(57) ABSTRACT

Provided are an amino resin composition, a varnish, a coating layer, and a product. The amino resin composition comprises a repeating unit represented by the following Formula (I):

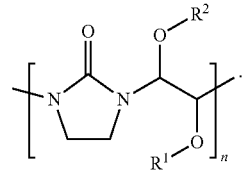

Formula (I)

A $^{13}$C-NMR spectrum of the amino resin composition has a first characteristic peak at 159 ppm to 161 ppm and a second characteristic peak at 70 ppm to 80 ppm. Based on the integral value of the first characteristic peak as 1, the integral value of the second characteristic peak is in the range from 0.01 to 0.25. Adopting the amino resin composition can accelerate the drying of the varnish and ensure the coating layer and the product have high hardness, high gloss and excellent color stability.

20 Claims, 10 Drawing Sheets

AMINO RESIN COMPOSITION AND VARNISH, COATING LAYER, AND PRODUCT COMPRISING THE SAME

CROSS-REFERENCE TO RELATED APPLICATION

Pursuant to 35 U.S.C. § 119(a), this application claims the benefits of the priority to Taiwan Patent Application No. 109101793, filed Jan. 17, 2020. The contents of the prior application are incorporated herein by its entirety.

BACKGROUND OF THE INVENTION

1. Field of the Invention

The present invention relates to an amino resin composition and a varnish, a coating layer and a product comprising the same, especially to an amino resin composition, a varnish comprising the amino resin composition, a coating layer and an amino resin product made from the amino resin composition.

2. Description of the Prior Arts

Amino resin is a resin formed by condensation polymerization of amino compounds, aldehyde compounds, and alcohol compounds. Amino resin can be used as a crosslinker in varnish, and its main function is to crosslink the polymer material into a three-dimensional network structure via chemical reaction, so as to adjust properties of the coating layer cured by the varnish. Therefore, amino resin has huge impact on the properties, quality and application scope of coating layers and resin products. How to improve and optimize the amino resin has become a key point in the research and development of various sectors.

There are mainly three kinds of amino resins in the market: urea formaldehyde resin (UF), melamine formaldehyde resin (MF) and melamine urea formaldehyde resin (MUF). In the past, UF contains free formaldehyde, a carcinogen, and is harmful to human body health, it has been gradually prohibited in many countries.

In consideration of the above reason, current researches have shifted to substitute formaldehyde with glyoxal as raw materials to develop amino resins without free formaldehyde. However, when glyoxal, amino compounds and alcohol compounds are used to produce amino resins, impurities will be inevitably produced in the preparation. These impurity residuals not only slow down the drying of the varnish formulated by the amino resins, but also deteriorate the hardness, gloss and color stability of the coating layer, resulting in the limited subsequent application of amino resins, and even inferior quality and value of amino resin products.

SUMMARY OF THE INVENTION

In consideration of the drawbacks of the prior art, one objective of the present invention is to modify and optimize conventional amino resins, so as to accelerate the drying of the varnish containing the amino resins.

Another objective of the present invention is to modify and optimize conventional amino resins, so as to increase the hardness, gloss and color stability of an amino resin coating layer.

In order to achieve the above objectives, the present invention provides an amino resin composition comprising a repeating unit represented by the following Formula (I):

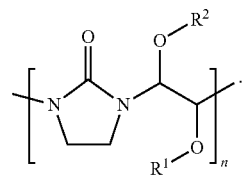

Formula (I)

A $^{13}$C-nuclear magnetic resonance spectrum ($^{13}$C-NMR spectrum) of the amino resin composition has a first characteristic peak at 159 parts per million (ppm) to 161 ppm and a second characteristic peak at 70 ppm to 80 ppm. Based on the integral value of the first characteristic peak as 1, the integral value of the second characteristic peak is in the range from 0.01 to 0.25.

In the Formula (I), $R^1$ and $R^2$ each may be independently a hydrogen atom or an alkyl group of 1 to 6 carbon atoms, i.e., a C1 to C6 alkyl group, and n is an integer from 1 to 15. In one embodiment, $R^1$ and $R^2$ each may be a C1 to C6 alkyl group, and $R^1$ and $R^2$ may be the same or different. $R^1$ and $R^2$ may be a linear alkyl group or a branched alkyl group. For example, $R^1$ and $R^2$ each may be independently, but are not limited to, a hydrogen atom, a methyl group, an ethyl group, a n-propyl group, an isopropyl group, a n-butyl group, a sec-butyl group, an isobutyl group, a n-pentyl group or a n-hexyl group.

With the first and the second characteristic peaks having certain integral values in its $^{13}$C-NMR spectrum, such amino resin composition can accelerate the drying of varnish comprising the same and ensure the amino resin coating layer with the merits of high hardness, high gloss and good color stability. In other words, adopting the amino resin composition of the present invention not only upgrades the production efficiency of subsequent products, but also improves the appearance, durability and industrial value of amino resin coating layers and amino resin products.

Preferably, in Formula (I), $R^1$ and $R^2$ each may be a linear alkyl group, such as a methyl group, a n-butyl group or a n-hexyl group.

As abovementioned, based on the integral value of the first characteristic peak as 1, the integral value of the second characteristic peak is preferably in the range from 0.01 to 0.24, or more preferably, the integral value of the second characteristic peak is in the range from 0.01 to 0.22; or even more preferably, the integral value of the second characteristic peak is in the range from 0.01 to 0.21, or even more further preferably, the integral value of the second characteristic peak is in the range from 0.01 to 0.20, so as to control the impurities of the amino resin composition in a relatively low range.

According to the present invention, in addition to the first and second characteristic peaks, the $^{13}$C-NMR spectrum of the amino resin composition also contains, but is not limited to, a third characteristic peak, a fourth characteristic peak, and/or a fifth characteristic peak. In one embodiment, the second characteristic peak may be located in the range from 73 ppm to 77 ppm, the third characteristic peak may be located in the range from 54 ppm to 58 ppm, the fourth characteristic peak may be located in the range from 65 ppm to 69 ppm, and the fifth characteristic peak may be located in the range from 80 ppm to 85 ppm. In another embodiment, the second characteristic peak may be located in the range from 73 ppm to 77 ppm, the third characteristic peak may be located in the range from 54.8 ppm to 56.2 ppm, the fourth characteristic peak may be located in the range from 66 ppm to 68.4 ppm, and the fifth characteristic peak may be located in the range from 80 ppm to 84 ppm.

It should be noted that one person skilled in the art is able to identify the chemical environments of the carbon atoms of components contained in the amino resin composition according to their respective chemical shifts of the characteristic peaks. The first characteristic peak in the range from 159 ppm to 161 ppm may correspond to the carbon atom of the amide group, —NCO group. The second characteristic peak in the range from 73 ppm to 77 ppm may correspond to the carbon atom of —C(OR)$_2$R. The third characteristic peak in the range from 54 ppm to 58 ppm may correspond to the carbon atom of methoxy, —OCH$_3$ group. The fourth characteristic peak in the range from 65 ppm to 69 ppm may correspond to the carbon atom of butoxy group, —OCH$_2$CH$_2$CH$_2$CH$_3$ group. The fifth characteristic peak in the range from 80 ppm to 85 ppm may correspond to the carbon atom of the —CH(NR)(OR').

In one embodiment, the ratio of the integral value of the third characteristic peak to the integral value of the fourth characteristic peak may be from 0.20 to 0.60. In another embodiment, the ratio of integral value of the third characteristic peak to that of the fourth characteristic peak may be from 0.23 to 0.60. In further another embodiment, the ratio of integral value of the third characteristic peak to that of the fourth characteristic peak may be from 0.25 to 0.60.

In one embodiment, the integral value of the third characteristic peak may be in the range from 0.30 to 1.20, the integral value of the fourth characteristic peak may be in the range from 1.50 to 2.40, and the integral value of the fifth characteristic peak may be in the range from 0.50 to 2.00. In another embodiment, the integral value of the third characteristic peak may be in the range from 0.40 to 1.20, the integral value of the fourth characteristic peak may be in the range from 1.80 to 2.10, and the integral value of the fifth characteristic peak may be in the range from 0.60 to 2.00.

Preferably, the viscosity of the amino resin composition may be more than or equal to 560 cps tested at the temperature of 25° C. In one embodiment, the viscosity of the amino resin composition may be more than or equal to 560 cps and less than or equal to 800 cps tested at 25° C. In another embodiment, the viscosity of the amino resin composition may be more than or equal to 580 cps and less than or equal to 750 cps tested at 25° C.

Preferably, the non volatile (NV) of the amino resin composition is in the range from 53 wt % to 70 wt %; more preferably, the non volatile of the amino resin composition is in the range from 65 wt % to 70 wt %.

Preferably, the chromaticity of the amino resin composition may be more than or equal to 120 and less than or equal to 260. More preferably, the chromaticity of the amino resin composition may be more than or equal to 130 and less than or equal to 240. Even more preferably, the chromaticity of the amino resin composition may be more than or equal to 150 and less than or equal to 200. To be specific, the chromaticity of the amino resin composition may be presented by APHA chromaticity.

According to the present invention, the amino resin composition may be prepared through the following synthetic reaction. Since the raw materials for producing the amino resin composition of the present invention do not include formaldehyde, the amino resin composition could be chosen as a solution to the limited application of conventional amino resins caused by the presence of free formaldehyde.

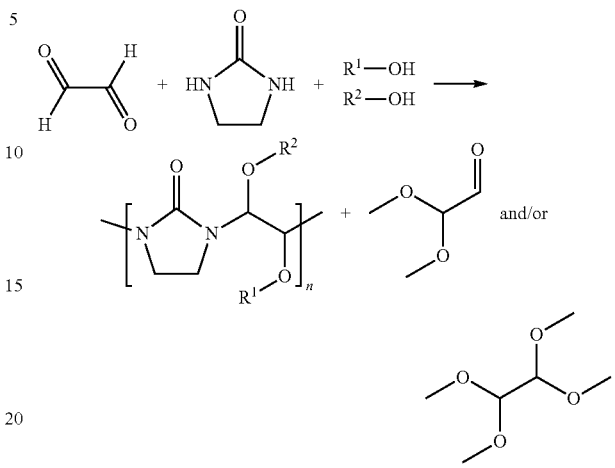

Herein, the R$^1$ and R$^2$ each may be independently a hydrogen atom or a C1 to C6 alkyl group. For example, R$^1$ and R$^2$ each may be independently, but are not limited to, a hydrogen atom, a methyl group, an ethyl group, an n-propyl group, an isopropyl group, an n-butyl group, a sec-butyl group or an isobutyl group. It is preferred that R$^1$ may be a methyl group and R$^2$ may be a n-butyl group.

In addition, the present invention also provides a varnish comprising the amino resin composition. The varnish in accordance with the present invention has the merits of rapid drying and good operability, thereby increasing the production efficiency of subsequent products.

Besides the above merits, the varnish comprising the amino resin composition of the present invention also has good stability for storage and may be stored at room temperature for as long as 3 days or even one month without obvious increase of varnish viscosity. Therefore, it is easy and convenient to handle. There is no special restriction on the viscosity of the varnish. One person skilled in the art can adjust the viscosity in a proper range according to different needs. In one embodiment, the varnish of the present invention is able to be stored at room temperature for at least one week and its viscosity variation will not surpass ±30%. In another embodiment, the varnish of the present invention is able to be stored at room temperature for at least 3 days and its viscosity variation will not surpass ±25%.

In one embodiment, the amino resin composition in the varnish may be used as a crosslinker. To be specific, the varnish may selectively comprise, but not limited to, at least one binder resin, at least one catalyst and/or at least one solvent.

In one embodiment, based on a total weight of the varnish, the amount of the amino resin composition may be from 20 wt % to 60 wt %, the amount of the binder resin may be from 15 wt % to 45 wt %, the amount of the catalyst may be from 1 wt % to 20 wt %, and the amount of the solvent may be from 10 wt % to 50 wt %. In another embodiment, based on a total weight of the varnish, the amount of the amino resin composition may be from 30 wt % to 50 wt %, the amount of binder resin may be from 20 wt % to 40 wt %, the amount of the catalyst may be from 5 wt % to 15 wt %, and the amount of the solvent may be from 15 wt % to 40 wt %.

According to the present invention, there is no special restriction on the selection of the amino resin composition provided that the binder resin is compatible to the amino resin composition. One person skilled in the art can choose appropriate binder resin based on the desired properties of amino resin coating layers or amino resin products. For example, the binder resin may be, but is not limited to, alkyd resin, polyester resin, epoxy resin, acrylic resin or any combination thereof. Taking alkyd resin as an example, the alkyd resin may be, but is not limited to, short oil alkyd resin, medium oil alkyd resin, long oil alkyd resin, super long oil alkyd resin, modified alkyd resin, synthetic fatty acid alkyd resin or any combination thereof.

Preferably, the amino resin composition may be combined with alkyd resin, so as to become a wood paint.

The catalyst may be an acid catalyst, which can promote the curing of the varnish at proper low temperature. For example, when a proper acid catalyst is added, the curing, also called solidification, will occur on the varnish at the low temperature from 20° C. to 50° C. In one embodiment, the acid catalyst may be, but is not limited to, sulfonic acid, phosphoric acid, sulfuric acid, oxalic acid or any combination thereof. Taking sulfonic acid as an example, the sulfonic acid may be, but is not limited to, para-toluenesulfonic acid (pTSA), 4-dodecylbenzenesulfonic acid (DBSA), dinonyl-naphthalenedisulphonic acid (DNNDSA) or any combination thereof.

There is no special restriction on the solvent. One person skilled in the art may choose proper solvents according to the components in the varnish. For example, the applicable solvent may be an organic solvent, such as alcohol, benzene, ester, ketone or ether. For example, the organic solvent may be, but is not limited to, methanol, ethanol, normal butanol, isobutanol, benzyl alcohol, benzene, toluene, xylene, ethyl acetate, butyl acetate, acetone, cyclohexanone or diethyl ether.

In addition, the present invention also provides an amino resin coating layer, which is formed by curing the varnish. In addition, the present invention further provides an amino resin product, which is prepared by coating the varnish on a substrate followed by curing, and the amino resin product comprises the amino resin coating layer.

With the amino resin composition, the varnish of the present invention, after coating on the substrate, has the merits of rapid drying, and furthermore, the cured amino resin coating layer has the good properties of high hardness, high gloss and good color stability. Therefore, the amino resin coating layers and the amino resin product have good appearance, durability and industrial value, which result in the expansion of their application fields.

According to the present invention, the substrate may be, but is not limited to, a wood substrate, a paper substrate, a textile substrate, a leather substrate, a glass substrate, a plastic substrate and/or a metal substrate. The amino resin coating layer is able to provide the protection to the surfaces of substrates and modify the surface properties of substrates through the amino resin coating layers thereon according to different needs.

In one embodiment, the substrate may be a wood substrate, and the abovementioned amino resin composition may be prepared into wood paints. In another embodiment, the substrate may be a glass substrate, and the abovementioned amino resin composition may be prepared into various coating materials. In further another embodiment, the substrate may be a metal substrate, and the abovementioned amino resin composition may be prepared into metallic baking paints.

In one embodiment, the varnish may be coated on the surface of the substrate in a wet thickness from 60 micrometers to 120 micrometers, but not limited thereto. One person skilled in the art may adjust the wet thickness according to different needs, so as to form an amino resin coating layer of good quality on the substrate.

Preferably, the hardness of the amino resin coating layer may reach 1H or even higher. In one embodiment, the hardness of the amino resin coating layer may be in the range from 1H to 4H; specifically, the hardness of the amino resin coating layer may be 1H, 2H, 3H and 4H. Therefore, the amino resin coating layer of the present invention can provide good protection for substrates, making both the amino resin coating layer and the amino resin product have hard surface and improving their durability.

Preferably, the 60° gloss of the amino resin coating layer may be more than 93 gloss units (GU). More preferably, the 60° gloss of the amino resin coating layer may be more than or equal to 94 GU. Even more preferably, the 60° gloss of the amino resin coating layer may be in the range from 95 GU to 98 GU. Accordingly, the amino resin coating layer and amino resin product of the present invention both exhibit high gloss, thereby improving their appearance.

In terms of color stability, the amino resin composition of the present invention is beneficial to mitigate and/or inhibit yellowing and the overall discoloration of the amino resin coating layer. Consequently, the amino resin coating layer and amino resin product have good appearance, durability and stability.

Other objectives, advantages and novel features of the invention will become more apparent from the following detailed description when taken in conjunction with the accompanying drawings.

DETAILED DESCRIPTION OF THE PREFERRED EMBODIMENTS

In the following, several examples are showed to demonstrate the implementation of an amino resin composition, a varnish, a coating layer and a product comprising the same, and several comparative examples are provided for comparison. One person skilled in the art can easily understand the merits and effects through these examples and comparative examples. It should be understood that the examples in the specification are only for the purpose of illustrating the implementation of the present invention, but shall not be used to limit the range of the present invention. One person skilled in the art can make necessary changes or modifications to implement or apply the content of the present invention without departing from the spirit of the present invention.

Amino Resin Composition

Example 1

Figure 1A:
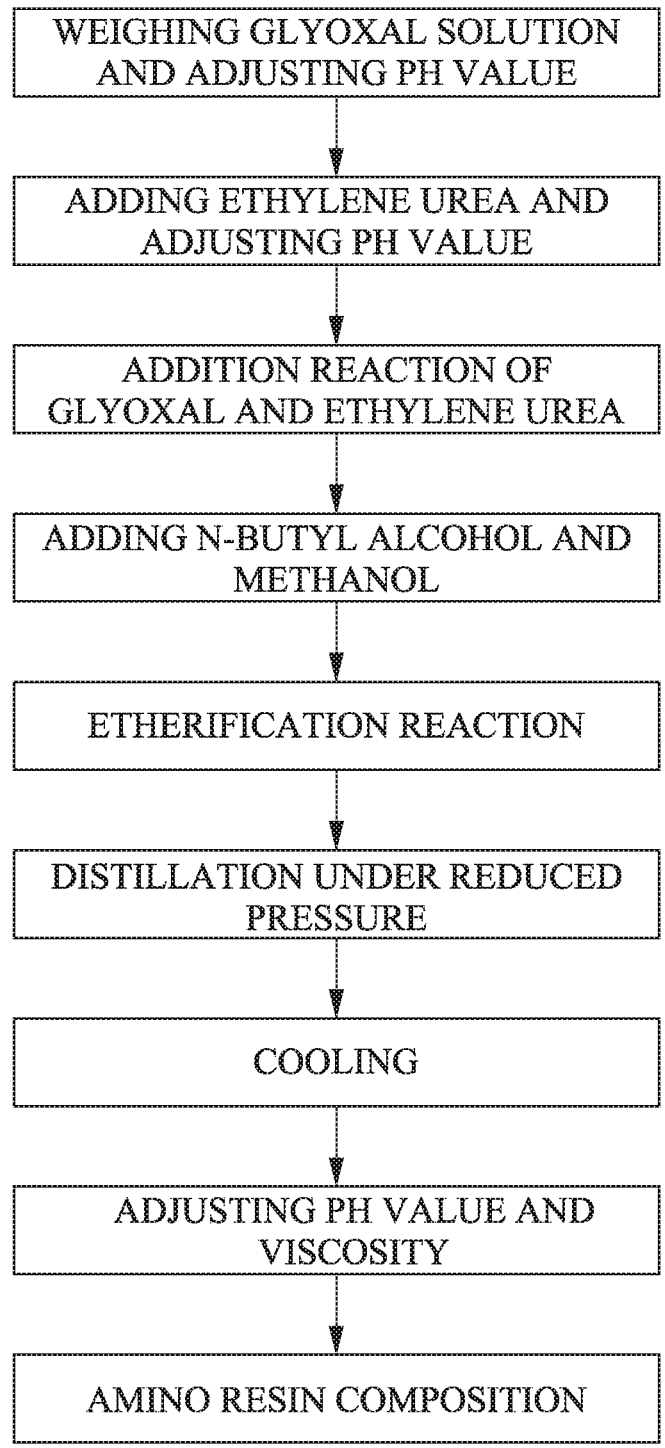
FIG. 1A is a schematic flow chart of preparing amino resin compositions of Examples 1 to 5 and Comparative Examples 1 and 2.

As shown in FIG. 1A, the amino resin composition of Example 1 was prepared by adding alcohol all in once, and its reaction formula and preparation were described as follows.

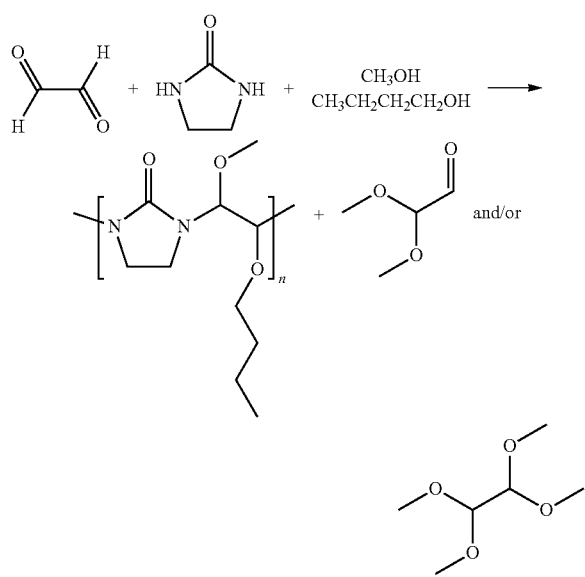

First, 362.5 g of 40 wt % glyoxal solution (about 2.5 mol) was weighed and adjusted to about pH 6.3 with 10% sodium bicarbonate aqueous solution. Then 193.5 g of ethylene urea (about 2.25 mol) was added into the foresaid solution, and adjusted to about pH 6.5 with an adequate amount of 1N hydrochloric acid, so as to undergo an addition reaction of the glyoxal and the ethylene urea for 2 hours under the condition of 40±5° C. and pH 6.5.

Next, about 481.0 g of n-butyl alcohol (about 6.5 mol) and about 416.0 g of methanol (about 13 mol) were added in the abovementioned mixture simultaneously, adjusted to around pH value between around 2.5 and 2.8 with 32% hydrochloric acid, followed by etherification reaction at 52±10° C. for 3 hours.

After that, the etherified mixture was distilled under 65±10° C. and a reduced pressure of 270 torr to 160 torr, followed by cooling to 30° C. to 40° C., and then adjusted to around pH 4.8 to pH 5.0 with 25% aqueous sodium hydroxide solution. The resulting solution was added with n-butanol to adjust its viscosity, so as to obtain the amino resin composition of Example 1. According to the above method, the preparation of the amino resin composition of Example 1 took totally 7.5 hours.

Example 2

As shown in FIG. 1A, the amino resin composition of Example 2 was also prepared by adding alcohol all in once, and its reaction formula was shown as that in Example 1 and the preparation was described as follows.

First, 362.5 g of 40 wt % glyoxal solution (about 2.5 mol) was weighed and adjusted to about pH 6.3 with 10% sodium bicarbonate aqueous solution. Then 258.0 g of ethylene urea (about 3 mol) was added into the foresaid solution, and adjusted to about pH 6.5 with addition of an adequate amount of 1N hydrochloric acid, so as to undergo an addition reaction of the glyoxal and the ethylene urea under the condition of 40±5° C. and pH 6.5 for 2 hours.

Next, about 740.0 g of n-butyl alcohol (about 10 mol) and about 480.0 g of methanol (about 15 mol) were added in the abovementioned mixture simultaneously, and adjusted to the pH value between around 2.5 and 2.8 with 32% hydrochloric acid, followed by etherification reaction at 58±10° C. for 3 hours.

After that, the etherified mixture was distilled under 60±10° C. and a reduced pressure of from 240 torr to 120 torr, followed by cooling to 30° C. to 40° C., and then adjusted to around pH 4.8 to pH 5.0 with 25% aqueous sodium hydroxide solution. The viscosity of the resulting solution was adjusted by the same manner as that of Example 1, so as to obtain the amino resin composition of Example 2. According to the above method, the preparation of the amino resin composition of Example 2 took totally 7.5 hours.

Example 3

As shown in FIG. 1A, the amino resin composition of Example 3 was also prepared by adding alcohol all in once, its reaction formula was shown as that in Example 1 and the preparation was described as follows.

First, 362.5 g of 40 wt % glyoxal solution (about 2.5 mol) was weighed and adjusted to about pH 6.3 with 10% sodium bicarbonate aqueous solution. Then 150.5 g of ethylene urea (about 1.75 mol) was added into the foresaid solution, and adjusted to about pH 6.5 with addition of an adequate amount of 1N hydrochloric acid, so as to undergo an addition reaction of the glyoxal and the ethylene urea under the condition of 40±5° C. and pH 6.5 for 2 hours.

Next, about 1111.0 g of n-butyl alcohol (about 15 mol) and about 480.0 g of methanol (about 15 mol) were added in the abovementioned mixture simultaneously, and adjusted to the pH value between around 2.5 and 2.8 with 32% hydrochloric acid, followed by etherification reaction at 58±10° C. for 3 hours.

After that, the etherified mixture was distilled under 65±10° C. and a reduced pressure of from 270 torr to 160 torr, followed by cooling to 30° C. to 40° C., and then adjusted to around pH 4.8 to pH 5.0 with 25% aqueous sodium hydroxide solution. The viscosity of the resulting solution was adjusted by the same manner as that of Example 1, so as to obtain the amino resin composition of Example 3. According to the above method, the preparation of the amino resin composition of Example 3 took totally 7.5 hours.

Example 4

As shown in FIG. 1A, the amino resin composition of Example 4 was also prepared by adding alcohol all in once, and its reaction formula was shown as that in Example 1 and the preparation was described as follows.

First, 362.5 g of 40 wt % glyoxal solution (about 2.5 mol) was weighed and adjusted to about pH 6.3 with 10% sodium bicarbonate aqueous solution. Then 236.5 g of ethylene urea (about 2.75 mol) was added into the foresaid solution, and adjusted to about pH 6.5 with addition of an adequate amount of 1N hydrochloric acid, so as to undergo an addition reaction of the glyoxal and the ethylene urea under the condition of 40±5° C. and pH 6.5 for 2 hours.

Next, about 740.0 g of n-butyl alcohol (about 10.0 mol) and about 640.0 g of methanol (about 20 mol) were added in the abovementioned mixture simultaneously, and adjusted to the pH value between around 2.5 and 2.8 with 32% hydrochloric acid followed by etherification reaction at 52±10° C. for 3 hours.

After that, the etherified mixture was distilled under 58±10° C. and a reduced pressure of from 240 torr to 120 torr, followed by cooling to 30° C. to 40° C., and then adjusted to around pH 4.8 to pH 5.0 with 25% aqueous sodium hydroxide solution. The viscosity of the resulting solution was adjusted by the same manner as that of Example 1, so as to obtain the amino resin composition of Example 4. According to the above preparation method, the preparation of the amino resin composition of Example 4 took totally 8 hours.

Example 5

As shown in FIG. 1A, the amino resin composition of Example 5 was also prepared by adding alcohol all in once, its reaction formula was shown as that in Example 1 and the preparation was described as follows.

First, 362.5 g of 40 wt % glyoxal solution (about 2.5 mol) was weighed and adjusted to about pH 6.3 with 10% sodium bicarbonate aqueous solution. Then 215.0 g of ethylene urea (about 2.5 mol) was added into the foresaid solution, and adjusted to about pH 6.5 with addition of an adequate amount of 1N hydrochloric acid, so as to undergo an addition reaction of the glyoxal and the ethylene urea under the condition of 40±5° C. and pH 6.5 for 2 hours.

Next, about 1110.0 g of n-butyl alcohol (about 15.0 mol) and about 320.0 g of methanol (about 10 mol) were added in the abovementioned mixture simultaneously, and adjusted to the pH value between around 2.5 and 2.8 with 32% hydrochloric acid followed by etherification reaction at 52±10° C. for 3 hours.

After that, the etherified mixture was distilled under 58±10° C. and a reduced pressure of from 240 torr to 120 torr, followed by cooling from 30° C. to 40° C., and then adjusted to around pH 4.8 to pH 5.0 with 25% aqueous sodium hydroxide solution. The viscosity of the resulting solution was adjusted by the same manner as that of Example 1, so as to obtain the amino resin composition of Example 5. According to the above method, the preparation of the amino resin composition of Example 5 took totally 8 hours.

Comparative Example 1

As shown in FIG. 1A, the amino resin composition of Comparative Example 1 was also prepared by adding alcohol all in once, its reaction formula was shown as that in Example 1 and the preparation was described as follows.

First, 362.5 g of 40 wt % glyoxal solution (about 2.5 mol) was weighed and adjusted to about pH 6.3 with 10% sodium bicarbonate aqueous solution. Then 215.0 g of ethylene urea (about 2.5 mol) was added into the foresaid solution, and adjusted to about pH 6.5 with addition of an adequate amount of 1N hydrochloric acid, so as to undergo an addition reaction of the glyoxal and the ethylene urea under the condition of 40±5° C. and pH 6.5 for 2 hours.

Next, about 740.0 g of n-butyl alcohol (about 10.0 mol) and about 640.0 g of methanol (about 20 mol) were added in the abovementioned mixture simultaneously, and adjusted to the pH value between around 2.5 to 2.8 with 32% hydrochloric acid, followed by etherification reaction at 75±10° C. for 3 hours.

After that, the etherified mixture was distilled under the condition of 75±10° C. and a reduced pressure of from 300 torr to 200 torr, followed by cooling to 30° C. to 40° C., and then adjusted to around pH 4.8 to pH 5.0 with 25% aqueous sodium hydroxide solution. The viscosity of the resulting solution was adjusted by the same manner as that of Example 1, so as to obtain the amino resin composition of Comparative Example 1. According to the above method, the preparation of the amino resin composition of Comparative Example 1 took totally 7 hours.

Comparative Example 2

As shown in FIG. 1A, the amino resin composition of Comparative Example 2 was also prepared by adding alcohol all in once, its reaction formula was shown as that in Example 1 and the preparation was described as follows.

First, 362.5 g of 40 wt % glyoxal solution (about 2.5 mol) was weighed and adjusted to about pH 6.3 with 10% sodium bicarbonate aqueous solution. Then 215.0 g of ethylene urea (about 2.5 mol) was added into the foresaid solution, and adjusted to about pH 6.5 with the addition of an adequate amount of 1N hydrochloric acid, so as to undergo an addition reaction of the glyoxal and the ethylene urea under the condition of 40±5° C. and pH 6.5 for 2 hours.

Next, about 148.0 g of n-butyl alcohol (about 2 mol) and about 640.0 g of methanol (about 20 mol) were added in the abovementioned mixture simultaneously, and adjusted to the pH value between around 2.5 to 2.8 with 32% hydrochloric acid followed by etherification reaction at 52±10° C. for 3 hours.

After that, the etherified mixture was distilled under the condition of 58±10° C. and a reduced pressure of from 240 torr to 120 torr, followed by cooling to 30° C. to 40° C., and then adjusted to around pH 4.8 to pH 5.0 with 25% aqueous sodium hydroxide solution. The viscosity of the resulting solution was adjusted by the same manner as that of Example 1, so as to obtain the amino resin composition of Comparative Example 2. According to the above method, the preparation of the amino resin composition of Comparative Example 2 took totally 8 hours.

Comparative Example 3

Figure 1B:
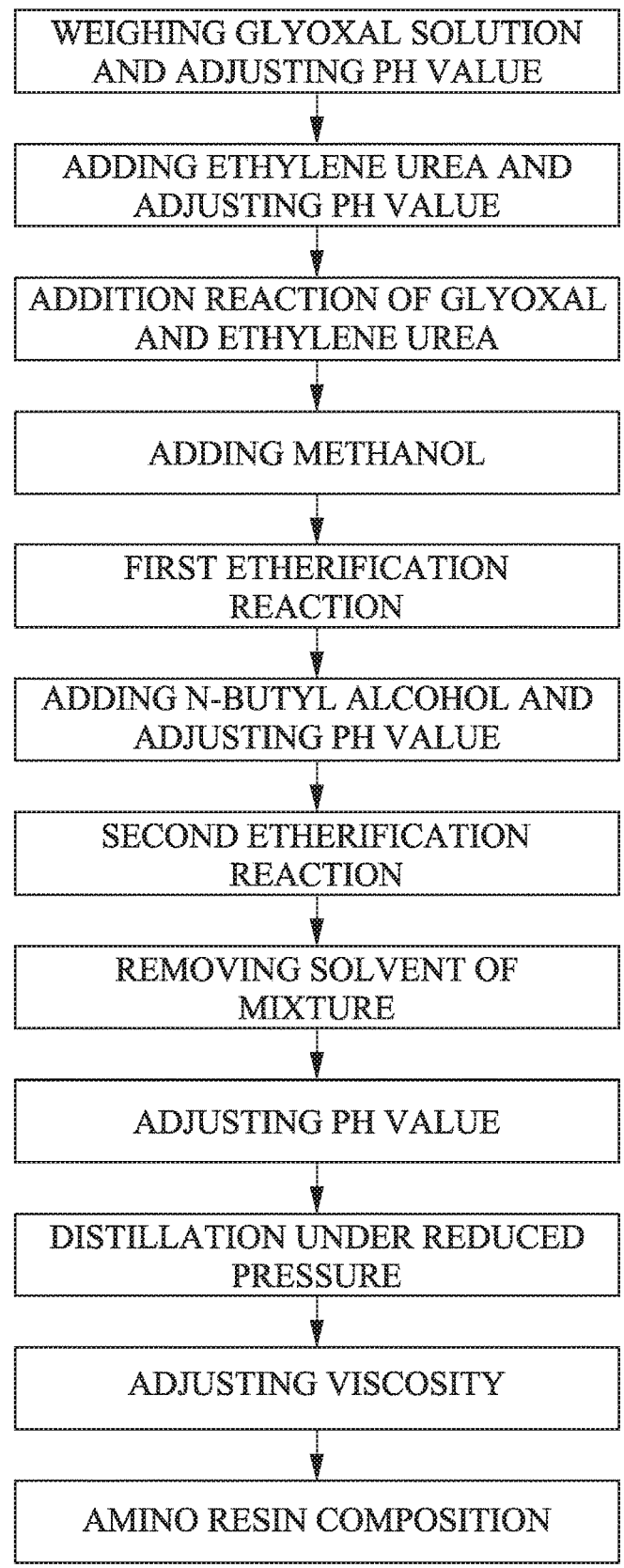
FIG. 1B is a schematic flow chart of preparing an amino resin composition of Comparative Example 3.
Figure 2:
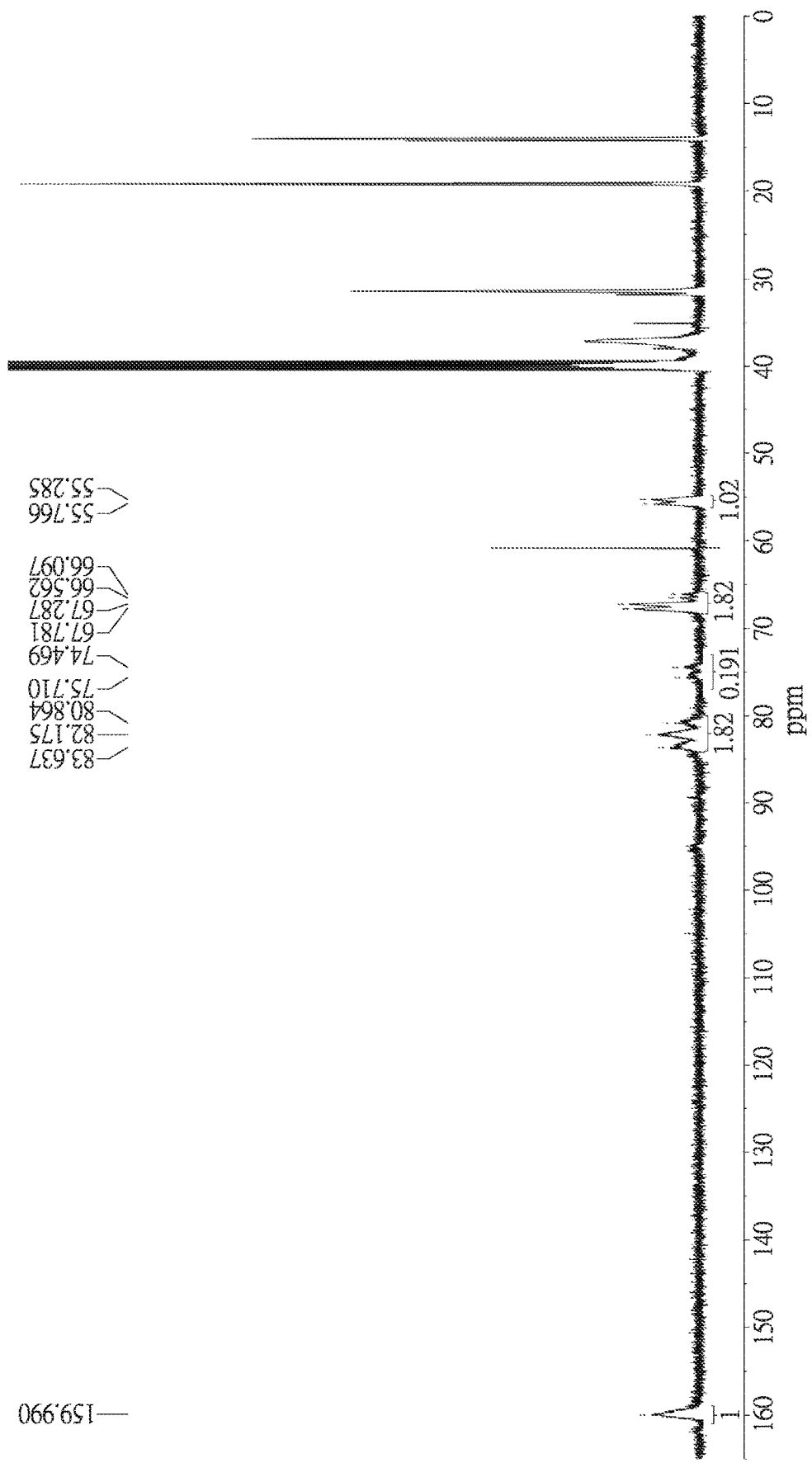
FIG. 2 to FIG. 6 are respectively $^{13}$C-NMR spectra of the amino resin compositions of Examples 1 to 5.
Figure 3:
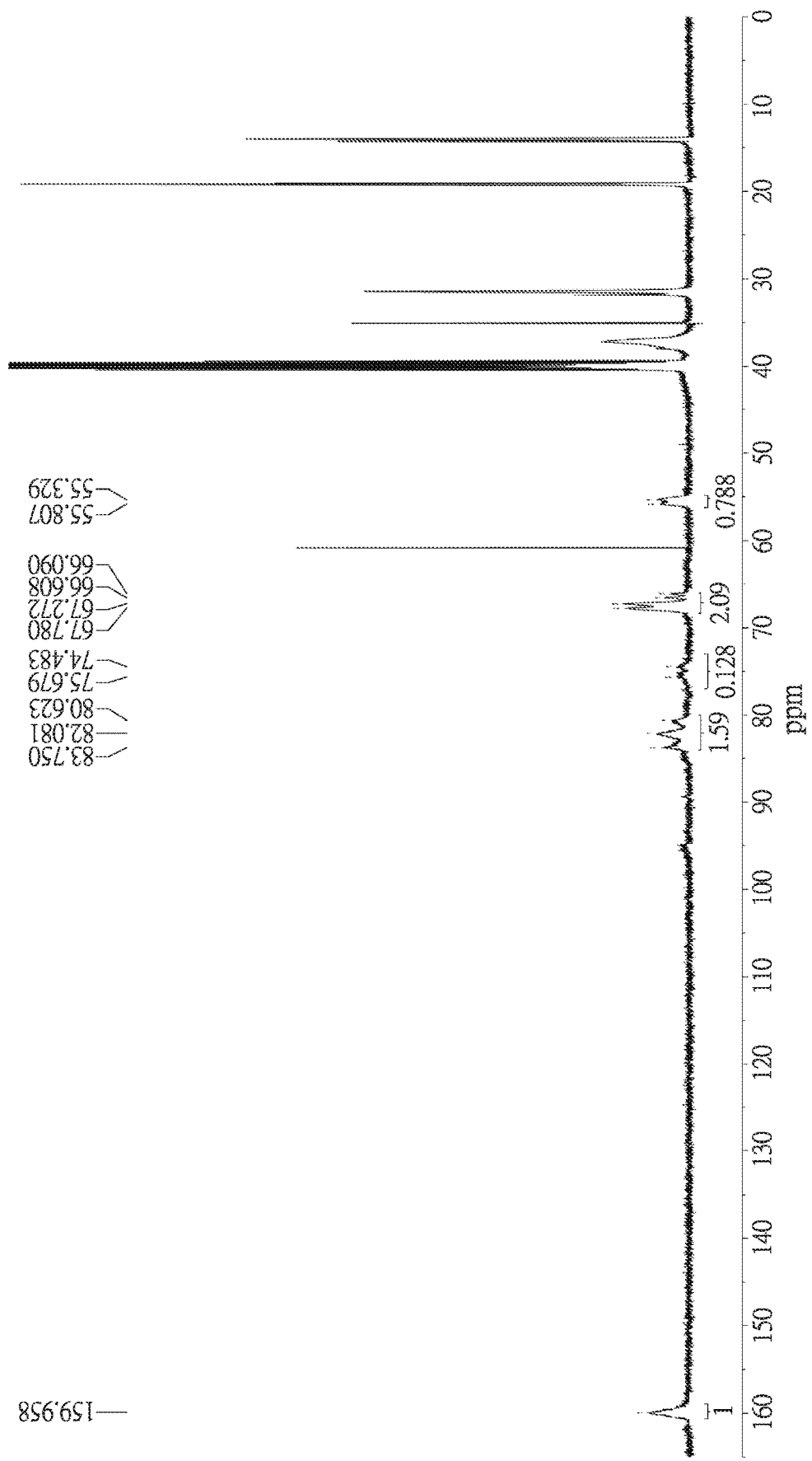
Figure 4:
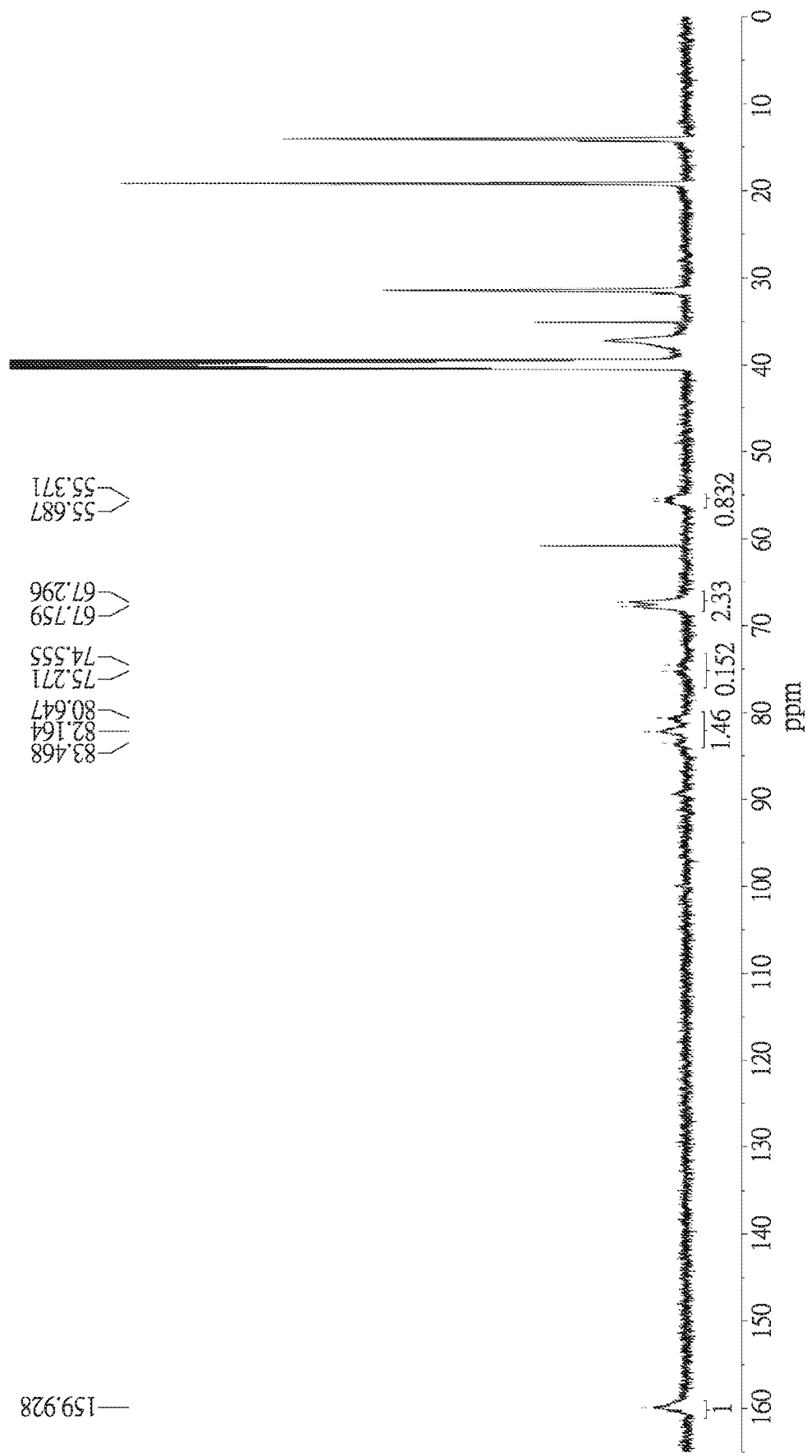
Figure 5:
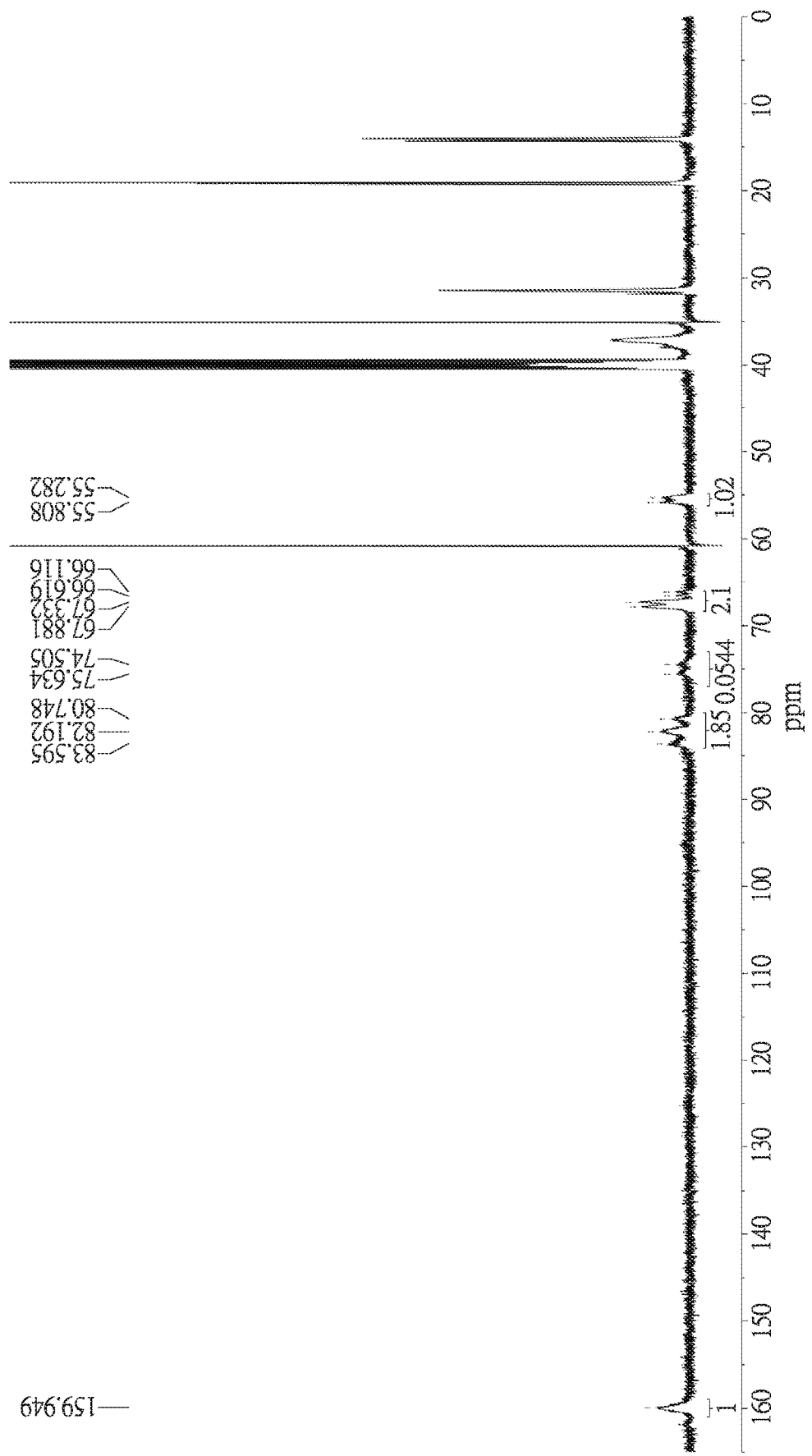
Figure 6:
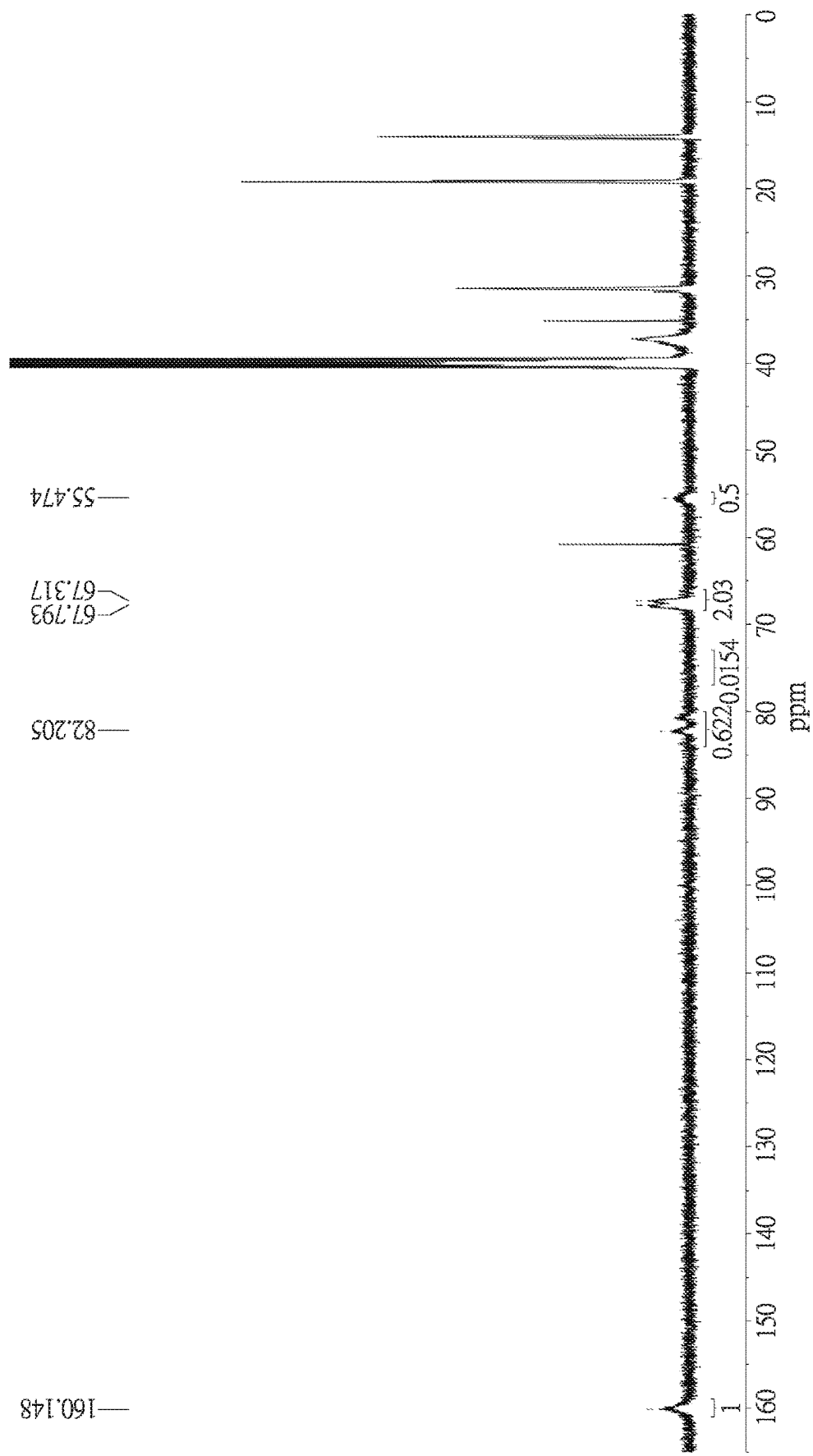
Figure 7:
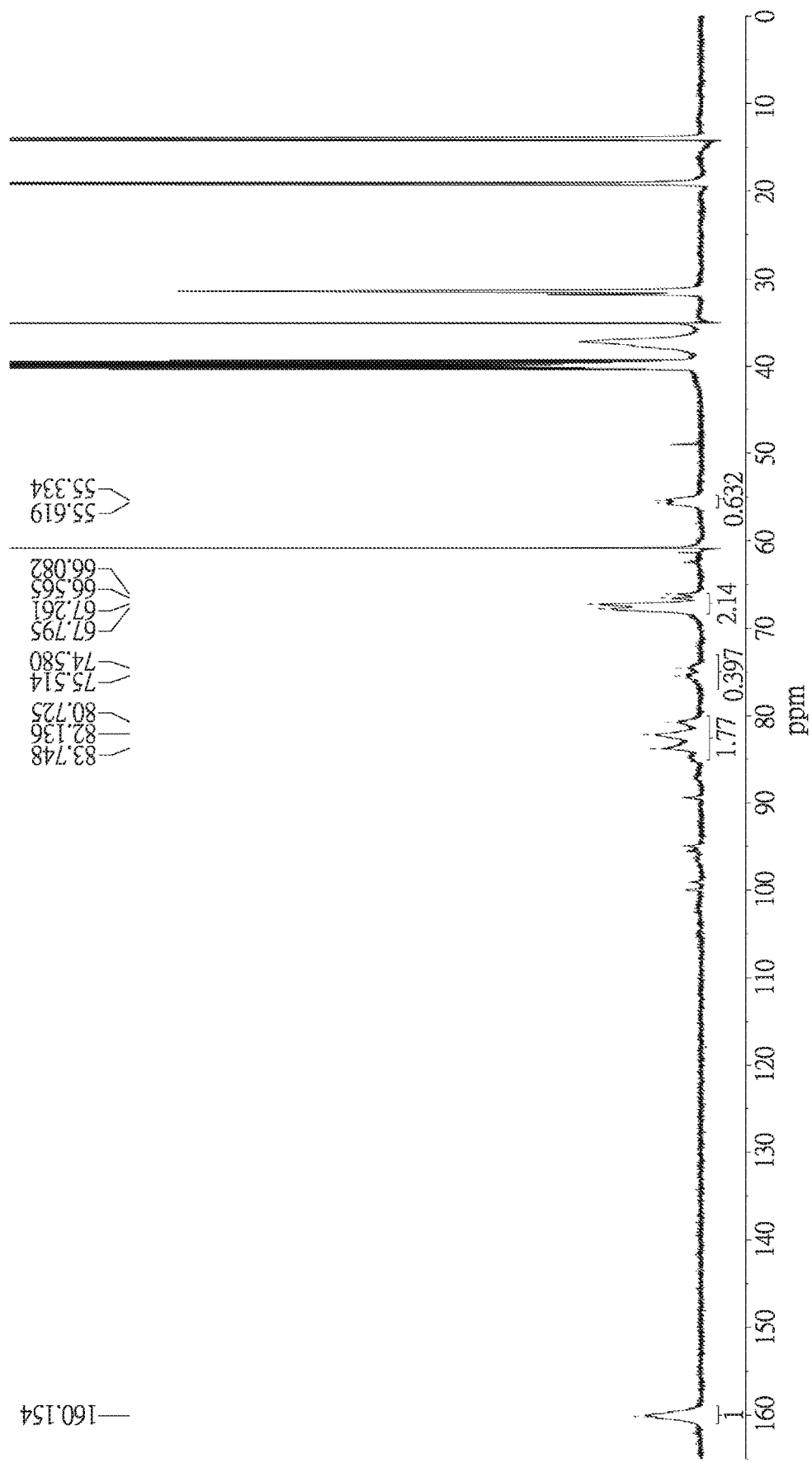
FIG. 7 to FIG. 9 are respectively $^{13}$C-NMR spectra of the amino resin compositions of Comparative Examples 1 to 3.
Figure 8:
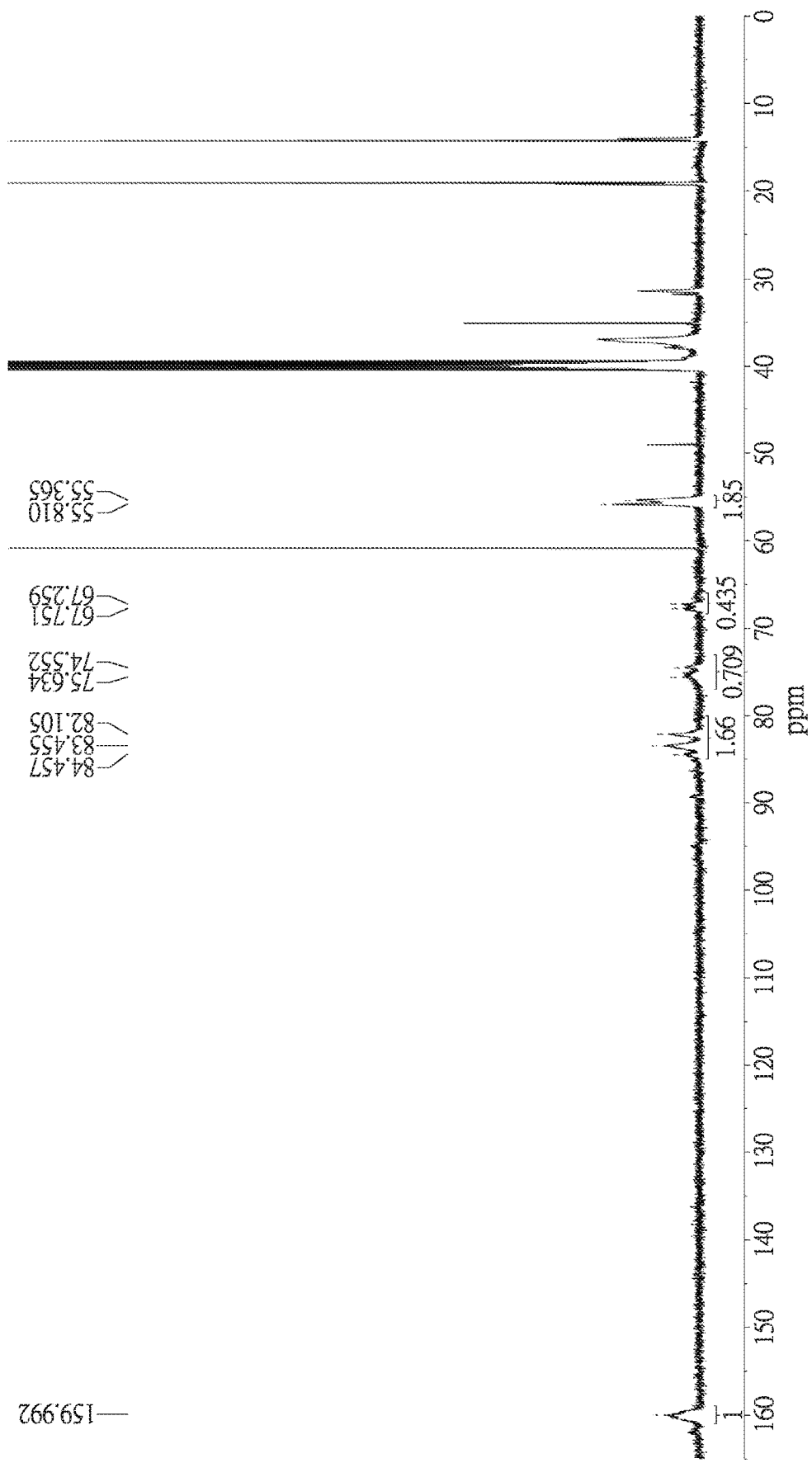
Figure 9:
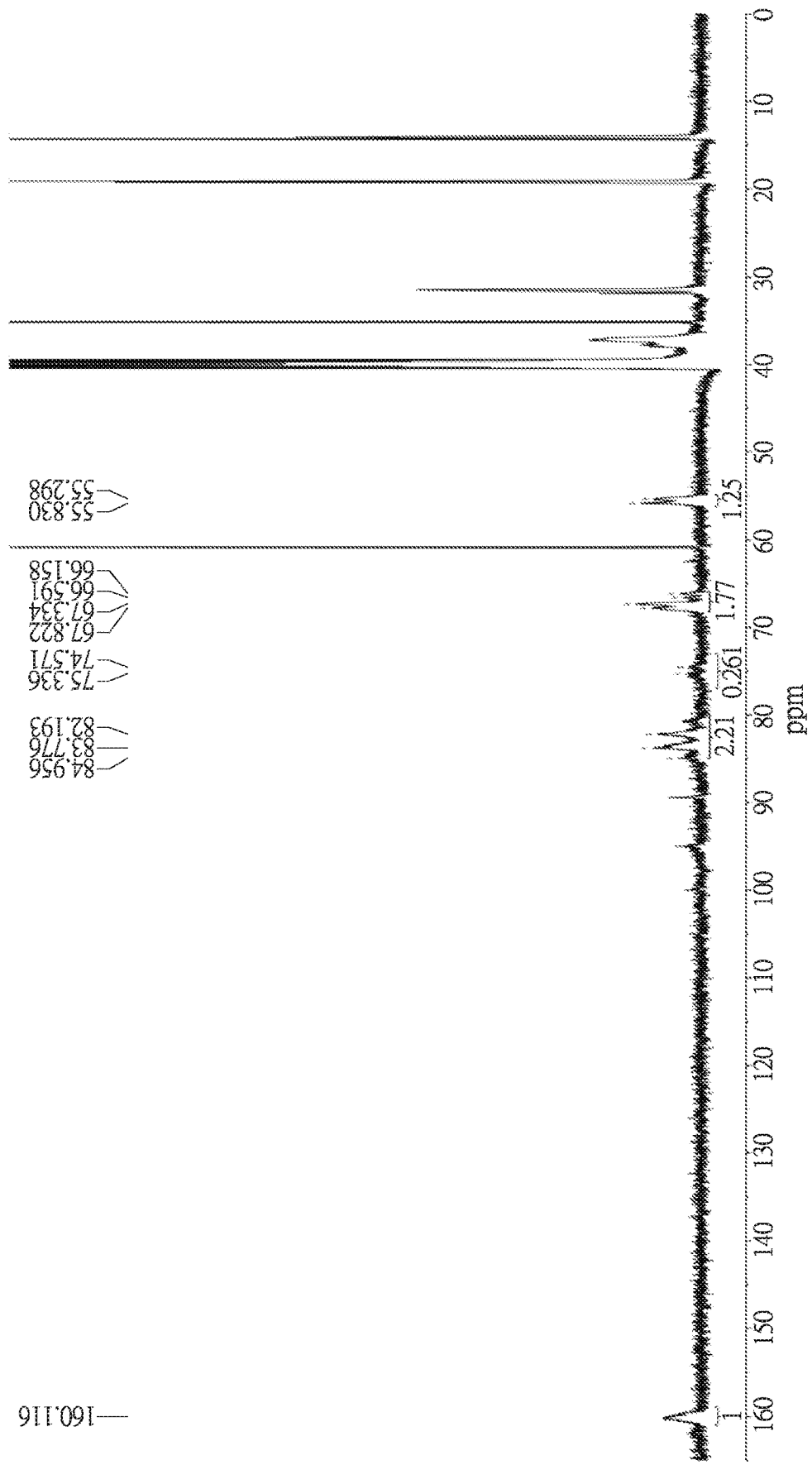

As shown in FIG. 1B, different from the preparation of the amino resin compositions of Examples 1 to 5 and Comparative Examples 1 and 2, the amino resin composition of Comparative Example 3 was prepared by adding alcohol in batches, and its preparation was described as follows.

First, 362.5 g of 40 wt % glyoxal solution (about 2.5 mol) was weighed and adjusted to about pH 6.3 with 10% sodium bicarbonate aqueous solution. Then 172.0 g of ethylene urea (about 2 mol) was added into the foresaid solution, and adjusted to about pH 6.5 with the addition of 1N hydrochloric acid, so as to undergo an addition reaction of the glyoxal and the ethylene urea under the condition of about 40±5° C. and pH 6.5 for 3 hours.

Next, about 480.0 g of methanol (about 15 mol) was added in the abovementioned mixture, and adjusted to the pH value between around 2.5 to 2.8 with 32% hydrochloric acid to undergo the first etherification reaction at 52±10° C. for 3 hours. After the completion of the first etherification reaction, about 1110.0 g of n-butyl alcohol (about 15 mol) was added in the abovementioned mixture, and adjusted to the pH value between around 2.5 to 2.8 with 32% hydrochloric acid to undergo the second etherification reaction at 52±10° C. for 1 hour.

Then the etherified mixture after the first and second etherification reactions was concentrated under the condition of 58±10° C. and a reduced pressure of from 240 torr to 120 torr to remove 40 wt % of solvent therein, and then adjusted to pH 6.5 to pH 7.0 with 25% aqueous sodium hydroxide solution. The mixture was further distilled under the condition of 58±10° C. and a reduced pressure of from 240 torr to 120 torr. The viscosity of the resulting solution was adjusted by the same manner as that of Example 1 to obtain the amino resin composition of Comparative Example 3. According to the above method, the preparation of the amino resin composition of Comparative Example 3 took totally 10 hours.

For convenience of explanation, the usage of glyoxal, ethylene urea, n-butyl alcohol and methanol, the temperature of etherification reaction, temperature and pressure of distillation as well as total time for the preparation of Examples 1 to 5 and Comparative Examples 1 to 3 are listed in Table 1.

TABLE 1 usage of raw materials and parameters set in the preparation of the amino resin compositions of Examples 1 to 5 (S1 to S5) and Comparative Examples 1 to 3 (C1 to C3).

|  | Example | | | | | Comparative Example | | |
|---|---|---|---|---|---|---|---|---|
|  | S1 | S2 | S3 | S4 | S5 | C1 | C2 | C3 |
| Glyoxal (mol) | 2.5 | 2.5 | 2.5 | 2.5 | 2.5 | 2.5 | 2.5 | 2.5 |
| Ethylene urea (mol) | 2.25 | 3 | 1.75 | 2.75 | 2.5 | 2.5 | 2.5 | 2 |
| n-Butyl alcohol (mol) | 6.5 | 10 | 15 | 10 | 15 | 10 | 2 | 15 |
| Methanol (mol) | 13 | 15 | 15 | 20 | 10 | 20 | 20 | 15 |
| Etherification temp. (° C.) | 52 ± 10 | 58 ± 10 | 58 ± 10 | 52 ± 10 | 52 ± 10 | 75 ± 10 | 52 ± 10 | 52 ± 10 |
| Distillation temp. (° C.) | 65 ± 10 | 60 ± 10 | 65 ± 10 | 58 ± 10 | 58 ± 10 | 75 ± 10 | 58 ± 10 | 58 ± 10 |
| Distillation pressure (torr) | 270-160 | 240-120 | 270-160 | 240-120 | 240-120 | 300-200 | 240-120 | 240-120 |
| Total time (hour) | 7.5 | 7.5 | 7.5 | 8 | 8 | 7 | 8 | 10 |

Test Example 1: $^{13}$C-NMR

In the test example, the amino resin compositions of Examples 1 to 5 and Comparative Examples 1 to 3 as samples were tested by using $^{13}$C-NMR spectrometer under the following conditions, so as to obtain the $^{13}$C-NMR spectra of Examples 1 to 5 and Comparative Examples 1 to 3 respectively.

$^{13}$C-NMR analysis conditions:
1. Apparatus: BRUKER AVANCE 500 NMR,
2. Dilution solvent: dimethyl sulfoxide-d6 (DMSO-d6), including 0.03 vol % tetramethylsilane (TMS),
3. Sample preparation: 500±50 mg of sample to be tested was diluted with equal weight of DMSO-d6 (error no more than ±5 mg), and the solution was charged into a glass tube of 5 mm diameter up to a height at least 5 cm,
4. Operation temperature: 300K,
5. Graph processing software: Nucleomatica iNMR ver. 6.2.2,
6. Spectrometer frequency: 500 megahertz (MHz),
7. Pulse width: 10 microseconds (μsec),
8. Acquisition time: 0.55 seconds,
9. Number of points: 32768 dots,
10. Spectral width: 29761 hertz, and
11. Recycle delay: 2 seconds.

FIG. 2 to FIG. 9 are respectively the $^{13}$C-NMR spectra of the amino resin compositions of Examples 1 to 5 and Comparative Examples 1 to 3 analyzed by the abovementioned methods. The chemical shifts and integral values of the first characteristic peak to the fifth characteristic peak showed in the $^{13}$C-NMR spectra are listed in Table 2.

It should be noted that the chemical shift of each characteristic peak in $^{13}$C-NMR spectra was calibrated based on the TMS chemical shift as 0 ppm, and permitted the identification of the chemical environments of the respective carbon atoms in the amino resin composition.

The structural formulae of components contained in the amino resin composition were shown as follows.

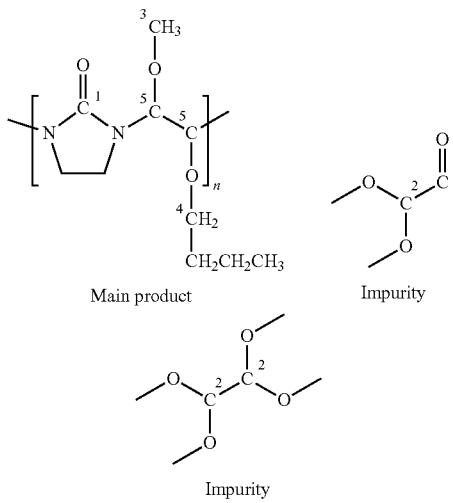

Main product                Impurity

Impurity

In FIG. 2 to FIG. 9, the first characteristic peak at 159 ppm to 161 ppm may correspond to the carbon atom of the amide group (—NCO group) of the main product which was marked as No. 1 carbon site in the above structural formula, the second characteristic peak at 73 ppm to 77 ppm may correspond to the carbon atom of impurities which was marked as No. 2 carbon site in the above structural formula, the third characteristic peak at 54.8 ppm to 56.2 ppm may correspond to the carbon of methoxy (—OCH$_3$ group) of the main product which was marked as No. 3 carbon site in the above structural formula, the fourth characteristic peak at 66 ppm to 68.4 ppm may correspond to the carbon of butoxy group (—OCH$_2$R group) of the main product which was marked as No. 4 carbon site in the above structural formula, and the fifth characteristic peak at 80 ppm to 84 ppm may correspond to the carbon of the —CH(NR)(OR') of the main product which was marked as No. 5 carbon site in the above structural formula.

Based on the integral value of the first characteristic peak, the integral values of the second characteristic peak to the fifth characteristic peak were respectively listed in Table 2. The ratio of the integral value of the third characteristic peak to the integral value of the fourth characteristic peak was obtained by dividing the integral value of the third characteristic peak by that of the fourth characteristic peak, and the round-off result was listed in Table 2.

TABLE 2 chemical shifts and integral values of the 1$^{st}$ to 5$^{th}$ characteristic peaks as well as the integral value ratios of 3$^{rd}$/4$^{th}$ characteristic peaks in $^{13}$C-NMR spectra of the amino resin compositions of S1 to S5 and C1 to C3.

| | | Integral Value | | | | | | | |
|---|---|---|---|---|---|---|---|---|---|
| | | Example | | | | | Comparative Example | | |
| No. | $^{13}$C δ(ppm) | S1 | S2 | S3 | S4 | S5 | C1 | C2 | C3 |
| 1$^{st}$ | 159 ~ 161 | 1 | 1 | 1 | 1 | 1 | 1 | 1 | 1 |
| 2$^{nd}$ | 73 ~ 77 | 0.191 | 0.128 | 0.152 | 0.0544 | 0.0154 | 0.397 | 0.709 | 0.261 |
| 3$^{rd}$ | 54.8 ~ 56.2 | 1.02 | 0.788 | 0.832 | 1.02 | 0.50 | 0.63 | 1.85 | 1.25 |
| 4$^{th}$ | 66 ~ 68.4 | 1.82 | 2.09 | 2.33 | 2.10 | 2.03 | 2.14 | 0.435 | 1.77 |
| 5$^{th}$ | 80 ~ 84 | 1.82 | 1.59 | 1.46 | 1.85 | 0.622 | 1.77 | 1.66 | 2.21 |
| Integral value ratio of 3$^{rd}$/4$^{th}$ characteristic peak | | 0.56 | 0.38 | 0.36 | 0.49 | 0.25 | 0.29 | 4.25 | 0.71 |

As indicated in Table 2 and FIG. 2 to FIG. 6 of the $^{13}$C-NMR spectra of amino resin compositions of Examples 1 to 5, when the integral values of the first characteristic peaks were each set to be 1, the integral values of the second characteristic peaks corresponding to the two impurities were in the range from 0.01 to 0.25. In contrary, as shown in Table 2 and FIG. 7 to FIG. 9 of the $^{13}$C-NMR spectra of amino resin compositions of Comparative Examples 1 to 3, the integral values of the second characteristic peaks corresponding to the two impurities were obviously more than 0.25, even reaching 0.4 or 0.7. Therefore, the composition difference between the amino resin compositions of Examples 1 to 5 and those of the Comparative Examples 1 to 3 could be easily identified from the integral values of the first and second characteristic peaks in their respective $^{13}$C-NMR spectra. To be specific, the amino resin compositions of the Comparative Examples 1 to 3 contained more impurities, thus their integral values of the second characteristic peaks were obviously more than those of the second characteristic peaks of the amino resin compositions of Examples 1 to 5.

Further, the $^{13}$C-NMR spectra of the amino resin compositions of Examples 1 to 5 showed that the integral values of the second characteristic peaks corresponding to the two impurities might be in the range from 0.01 to 0.20 based on the integral value of the first characteristic peak as 1.

From the results of Table 2 and FIG. 2 to FIG. 6, the ratio of the integral value of the third characteristic peak to that of the fourth characteristic peak was 0.20 to 0.60 in each of the $^{13}$C-NMR spectra of the amino resin compositions of Examples 1 to 5. In contrary, from the results of Table 2, FIG. 8 and FIG. 9, the ratio of the integral value of the third characteristic peak to that of the fourth characteristic peak was more than 0.60 in the $^{13}$C-NMR spectra of the amino resin compositions of Comparative Examples 2 and 3.

Furthermore, the ratio of the integral value of the third characteristic peak to that of the fourth characteristic peak was within 0.30 and 0.60 in each of the $^{13}$C-NMR spectra of the amino resin compositions of Examples 1 to 4. In contrary, from the results of Table 2 and FIG. 7 to FIG. 9, the ratio of the integral value of the third characteristic peak to that of the fourth characteristic peak was out of the range from 0.30 to 0.60 in each of the $^{13}$C-NMR spectra of the amino resin compositions of Comparative Examples 1 to 3.

As indicated in Table 2 and FIG. 2 to FIG. 6, each of the $^{13}$C-NMR spectra of amino resin compositions of Examples 1 to 5 had the third characteristic peak with the integral value from 0.30 to 1.20, the fourth characteristic peak with the integral value from 1.50 to 2.40, and the fifth characteristic peak with the integral value from 0.50 to 2.00 when the integral value of the first characteristic peak was set to be 1.

Test Example 2: Property Analysis

The test example adopted the same standard method to measure the color, non volatile and viscosity of the amino resin compositions of Examples 1 to 5 as well as Comparative Examples 1 to 3, and their results were listed in Table 3.

These three properties were measured based on the following standard methods.

1. Color (APHA chromaticity): DIN EN ISO 6271;
2. Non volatile (NV): DIN 55671 (foil, test for 45 min at 45° C.); and
3. Viscosity: DIN EN ISO 3219.

TABLE 3 results of property analysis of the amino resin compositions of Examples 1 to 5 and Comparative Examples 1 and 3.

| | Example | | | | | Comparative Example | | |
|---|---|---|---|---|---|---|---|---|
| Item | S1 | S2 | S3 | S4 | S5 | C1 | C2 | C3 |
| APHA chromaticity | 195.4 | 247.8 | 251.9 | 156.2 | 155.3 | 346.2 | 404.6 | 263.5 |
| Non volatile (wt %) | 69.4 | 68.9 | 66.9 | 65.7 | 66.2 | 52.9 | 70.8 | 70.6 |
| Viscosity (cps @ 25° C.) | 643.9 | 723.0 | 603.8 | 624.0 | 684.8 | 533.9 | 550.0 | 493.9 |

As indicated in Table 3, the APHA chromaticity of the amino resin compositions of Examples 1 to 5 might be more than or equal to 120 and less than or equal to 260; more specifically, the APHA chromaticity of the amino resin compositions of Examples 1 to 5 might be more than or equal to 150 and less than or equal to 200. On the contrary, the APHA chromaticity of the amino resin compositions of Comparative Examples 1 to 3 was all more than 260.

In terms of non volatile, as indicated in Table 3, the non volatile of the amino resin compositions of Examples 1 to 5 might be more than or equal to 53 wt % and less than or equal to 70 wt %; more specifically, the non volatile of amino resin compositions of Examples 1 to 5 may be more than or equal to 65 wt % and less than or equal to 70 wt %. On the contrary, the non volatile of the amino resin compositions of Comparative Examples 1 to 3 was out of the range from 53 wt % to 70 wt %.

With regard to viscosity of the amino resin compositions tested at 25° C., the viscosity of the amino resin compositions of Examples 1 to 5 might be more than or equal to 560 cps; more specifically, the viscosity of the amino resin compositions of Examples 1 to 5 might be more than or equal to 560 cps and less than or equal to 800 cps; much more specifically, the viscosity of the amino resin compositions of Examples 1 to 5 might be more than or equal to 560 cps and less than or equal to 750 cps. On the contrary, the viscosity of chromaticity amino resin compositions of Comparative Examples 1 to 3 at 25° C. was all less than 560 cps.

According to the above property analysis results, the color, non volatile or viscosity of the amino resin compositions of Examples 1 to 5 were all different from those of the amino resin compositions of Comparative Examples 1 to 3.

Varnish

Examples 1A to 5A and Comparative Examples 1A to 3A

Examples 1A to 5A and Comparative Examples 1A to 3A respectively adopted the amino resin compositions of Examples 1 to 5 and Comparative Examples 1 to 3 as crosslinker, which were respectively mixed with the same binder resin, the same catalyst and the same solvent in the same amounts by the same method to prepare the varnishes. The kinds and amounts of the crosslinker, the binder resin, the catalyst and the solvent were listed in Table 4. That is, the varnishes of Examples 1A to 5A and Comparative Examples 1A to 3A were just distinguished from their adopted amino resin compositions.

TABLE 4 components and amounts of each reagent in varnishes.

| | Component | Amount |
|---|---|---|
| Crosslinker | Amino Resin Composition | 40 wt % |
| Binder resin | short oil synthetic fatty acid alkyd resin[1] | 28 wt % |
| Catalyzer | para-toluenesulfonic acid solution[2] | 11 wt % |
| | isobutanol | 13 wt % |
| Solvent | methanol | 6 wt % |
| | toluene | 2 wt % |

[1]short oil synthetic fatty acid alkyd resin, model: A932-80, purchased from Daily polymer.
[2]para-toluenesulfonic acid solution, pTSA was dissolved in butanol to prepare a 40 wt % pTSA solution.

In the preparation, the short oil synthetic fatty acid alkyd resin was charged into the reaction flask, and then the respective amino resin composition and the three solvents were added and stirred to get an even solution. Next, pTSA solution was added into the solution and stirred to get a 50 wt % non volatile of varnish.

The varnish of Example 1A was prepared by using the amino resin composition of Example 1, the varnish of Example 2A was prepared by using the amino resin composition of Example 2, and then the varnishes of Examples 1A to 5A and Comparative Examples 1A to 3A could be prepared by the similar method.

Test Example 3: Storage Stability

In the instant test example, the varnishes of Example 1A to 5A as samples were measured with a rotary viscometer (manufacturer: AMETEK, model: DV2T HBCJ0) based on the standard method of DIN EN ISO 321 at 25° C., so as to obtain and record their viscosity at 0 day of storage. After that, the samples were stored at 50° C. for 16 days. During the storage at 50° C., the viscosity of the samples was measured after 4 days, 8 days, 12 days and 16 days of storage, and the results were listed in Table 5.

TABLE 5 viscosity (cps) of varnishes of Examples 1A to 5A (S1A to S5A) with different storage time.

| | Example | | | | |
|---|---|---|---|---|---|
| Storage time | S1A | S2A | S3A | S4A | S5A |
| 0 day | 54.35 | 68.65 | 56.35 | 60.15 | 60.15 |
| 4 days | 45.78 | 61.04 | 44.73 | 46.04 | 46.04 |
| 8 days | 44.47 | 61.48 | 45.78 | 42.64 | 42.64 |
| 12 days | 39.76 | 55.2 | 39.24 | 39.24 | 39.24 |
| 16 days | 36.89 | 47.61 | 35.32 | 36.89 | 36.89 |

From the results of Table 5, the viscosity variations of varnishes of Examples 1A to 5A were controlled under ±25% after 4 days of storage, the viscosity variations of varnishes of Examples 1A to 5A were controlled under ±30% after 8 days of storage, the viscosity variations of varnishes of Examples 1A to 5A were controlled under ±35% after 12 days of storage, and the viscosity variations of varnishes of Examples 1A to 5A were controlled under ±40% after 16 days of storage.

As shown in Table 5, the varnishes of Example 1A to 5A did not exhibit obvious change on viscosity after 16 days of storage at 50° C. The varnishes prepared by using the amino resin compositions of Examples 1 to 5 would not be hardened within a short period, indicating that the varnishes of Examples 1A to 5A could be applicable to be coated on substrates to prepare the amino resin coating layers even if they have been stored for a while. It demonstrates that the varnishes of Examples 1A to 5A all exhibit a good storage stability.

Amino Resin Coating Layer

Examples 1B to 5B and Comparative Examples 1B to 3B

To prepare the amino resin coating layers of Examples 1B to 5B and Comparative Examples 1B to 3B, the varnishes of Examples 1A to 5A and Comparative Examples 1A to 3A were respectively coated on the glass substrates of same model and then cured at 30° C. for 24 hours.

As abovementioned, the amino resin coating layer of Example 1B was prepared by curing the varnish of Example 1A coated on the glass substrate, while the amino resin coating layer of Example 2B was prepared by curing the varnish of Example 2A coated on the glass substrate, and so on, such that the amino resin coating layers of Examples 1B to 5B and Comparative Examples 1B to 3B were respectively prepared by curing their respective varnishes coated on the glass substrates.

Test Example 4: Hardness

The amino resin coating layers of Examples 1B to 5B and Comparative Examples 1B to 3B were tested by the standard method of ASTM 3363. The results of pencil hardness testing were recorded from soft to hard in order as 2B, 1B, HB, F, 1H and 2H, and the results were listed in Table 6.

As shown in Table 6, the hardness of the amino resin coating layers of Examples 1B to 5B all could reach 1H or higher; in comparison, the hardness of the amino resin coating layers of Comparative Examples 1B and 3B was only 1B and the hardness of the amino resin coating layer of Comparative Example 2 was only HB. It indicates that the varnishes prepared by using the amino resin compositions of Examples 1 to 5 were indeed able to raise the hardness of the amino resin coating layers, making the hardness of the amino resin coating layers of Examples 1B to 5B several grades higher than that of the amino resin coating layers of Comparative Examples 1B to 3B.

Test Example 5: Drying Speed

In the instant test example, the varnishes of Examples 1A to 5A and Comparative Examples 1A to 3A were respectively coated on the glass substrates with a wet film thickness of 100 micrometers, and then gradually cured into the amino resin coating layers at 30° C. During curing, the drying speed of the varnishes was measured by the standard method of ASTM D5895, and recorded the set-to-touch time, tack-free time and dry-through time with a drying time recorder (Manufacturer: TQC Sheen, Model: BK-3 SHEEN VF8005). The results were listed in Table 6.

As shown in Table 6, in the process that the varnishes of Examples 1A to 5A was dried and cured into Examples 1B to 5B, the set-to-touch time was all not more than 3 minutes, the tack-free time was all not more than 5 and a half minutes and the dry-through time was not more than 35 minutes. On the contrary, in the process that the varnishes of Comparative Examples 1A to 3A were dried and cured into Comparative Examples 1B to 3B, the required set-to-touch time was at least 3 minutes and 18 seconds, the tack-free time were all longer than 5 and a half minutes and the dry-through time were all longer than 37 minutes. It can be seen that the varnishes prepared by using the amino resin compositions of Examples 1 to 5 were surely able to accelerate the drying speed of varnish, shorten the required time for drying and curing the varnishes into amino resin coating layers, so as to raise the production efficiency and improve the industrial value.

TABLE 6 pencil hardness, set-to-touch time, tack-free time and dry-through time of the amino resin coating layers of Examples 1B to 5B (S1B to S5B) and Comparative Example 1B to 3B (C1B to C3B) on glass substrates.

|  | Example | | | | | Comparative Example | | |
| --- | --- | --- | --- | --- | --- | --- | --- | --- |
|  | S1B | S2B | S3B | S4B | S5B | C1B | C2B | C3B |
| Pencil hardness | 1H | 1H | 1H | 1H | 1H | 1B | HB | 1B |
| Set-to-touch time | 2'35" | 2'52" | 2'22" | 2'48" | 2'29" | 3'33" | 3'18" | 5'20" |
| Tack-free time | 5'03" | 5'30" | 5'26" | 5'18" | 5'22" | 5'54" | 6'50" | 11'30" |
| Dry-through time | 26.7' | 35.0' | 30.1' | 31.6' | 29.4' | 37.6' | 51.1' | 43.0' |

Examples 1C to 5C and Comparative Examples 1C to 3C

The varnishes of Examples 1A to 5A and Comparative Examples 1A to 3A prepared by the abovementioned methods were coated on the white wood substrates of same model respectively, and then cured at 30° C. for 24 hours, so as to obtain the amino resin coating layers of Examples 1C to 5C and Comparative Examples 1C to 3C.

As abovementioned, the amino resin coating layer of Example 1C was prepared by curing the varnish of Example 1A coated on the white wood substrate, while the amino resin coating layer of Example 2C was prepared by curing the varnish of Example 2A coated on the white wood substrate, and so on, such that the amino resin coating layers of Examples 1C to 5C and Comparative Examples 1C to 3C were respectively prepared by curing the varnishes coated on white wood substrates.

Test Example 6: Gloss

The amino resin coating layers of Examples 1C to 5C and Comparative Examples 1C to 3C were tested for their gloss at 60° with a micro three-angle gloss meter (manufacturer: BYK, model: mirco-TRI-gloss) based on the standard method of ASTM D523. Three sets of data in the measure area of 75 mm*150 mm were recorded and averaged to give the 60° gloss as listed in Table 7.

TABLE 7

60° gloss of the amino resin coating layers of Examples 1C to 5C (S1C to S5C) and Comparative Examples 1C to 3C (C1C to C3C) on wood substrates.

|  | Example | | | | | Comparative Example | | |
| --- | --- | --- | --- | --- | --- | --- | --- | --- |
|  | S1C | S2C | S3C | S4C | S5C | C1C | C2C | C3C |
| 60° Gloss (GU) | 97.1 | 96.2 | 95.5 | 97.3 | 97.0 | 87.9 | 93.0 | 92.6 |

As shown in Table 7, the 60° gloss of the amino resin coating layers of Examples 1C to 5C was all more than 93 GU. On the contrary, the 60° gloss of the amino resin coating layers of Comparative Examples 1C to 3C was all less than or equal to 93 GU, especially, the 60° gloss of the amino resin coating layer of Comparative Example 1C failed to reach 88 GU. It can be seen that the varnishes prepared by using the amino resin compositions of Examples 1 to 5 were surely able to enhance gloss of the amino resin coating layers, so as to improve the appearance and industrial value.

To specify in more detail, the 60° gloss of the amino resin coating layers of Examples 1C to 5C could be all more than or equal to 94 GU, even up to 95 GU to 98 GU, which allows the wood products protected by the amino resin coating layers of Example 1C to 5C to have superior appearance and industrial value.

Test Example 7: Color

The amino resin coating layers of Examples 1C to 5C and Comparative Examples 1C to 3C were adopted as samples and measured by a colorimeter (manufacturer: HunterLab, model: color quest XE) based on the standard method of ISO 7724. Three sets of data were recorded with the average value as the initial brightness ($L_1$) as well as the initial chromaticity $a_1^*$, $b_1^*$ of each amino resin coating layer. The samples were placed at 50° C. for one week to accelerate the aging of the amino resin coating layers at such temperature. After that, each sample was tested according to the above method with three sets of data recorded, and the average value was taken as the brightness ($L_2$) and chromaticity $a_2^*$, $b_2^*$ of each amino resin coating layer after the aging test.

It can be understood for one person skilled in the art that, the color of the amino resin coating layer can be defined according to the color system of L*a*b* of the Commission Internationale de l'Eclairage (CIE). L value refers to the relative degree of brightness and darkness of a coating layer, the higher L value indicates that the coating layer is brighter and closer to white, while the lower L value indicates that the coating layer is darker and closer to black. Chromaticity a* denotes the relative degree of red and green of a coating layer, the higher a* value indicates that the coating layer is closer to red while the lower a* value indicates that the coating layer is closer to green. Chromaticity b* denotes the relative degree of yellow and blue of a coating layer, the higher b* value indicates that the coating layer is closer to yellow while the lower b* value indicates that the coating layer is closer to blue.

The test results of each sample tested before and after aging test were listed in Table 8. The difference of the brightness $L_2$ of each sample after aging test deducted by the initial brightness $L_1$ was represented as $\Delta L$, the difference of the chromaticity $a_2^*$ of each sample after aging test deducted by the initial chromaticity $a_1^*$ was represented as $\Delta a$, and the difference of the chromaticity $b_2^*$ of each sample after aging test deducted by the initial chromaticity $b_1^*$ was represented as $\Delta b$. In the experiment, the yellowing degree might be evaluated by $\Delta b$, the overall color change might be evaluated by $\Delta E$, and the color stability may be evaluated by both $\Delta b$ and $\Delta E$. Herein, $\Delta E$ may be calculated by formula:

$$\Delta E=(\Delta L^2+\Delta a^2+\Delta b^2)^{1/2}.$$

As shown in Table 8, $\Delta b$ of the amino resin coating layers of Examples 1C to 5C before and after the aging test were all controlled under 8.0. On the contrary, $\Delta b$ of the amino resin coating layers of Comparative Examples 1C to 3C before and after aging test were all as high as 8.11 and more, especially, $\Delta b$ of the amino resin coating layer of Comparative Example 1C before and after aging test reached as high as 8.33. The $\Delta b$ of Examples 1C to 5C in comparison with those of Comparative Examples 1C to 3C indicated that the amino resin coating layers of Comparative Examples 1C to 3C incurred obvious aging and yellowing after the aging test while the yellowing of the amino resin coating layers of Examples 1C to 5C, which adopted the amino resin compositions of Examples 1 to 5, were effectively mitigated and/or prevented, so that $\Delta b$ could be reduced as much as possible.

TABLE 8 color analysis results of the amino resin coating layers of Examples 1C to 5C (S1C to S5C) and Comparative Examples 1C to 3C (C1C to C3C) before and after aging test.

|  | Example | | | | | Comparative Example | | |
|---|---|---|---|---|---|---|---|---|
|  | S1C | S2C | S3C | S4C | S5C | C1C | C2C | C3C |
| $L_1$ | 92.41 | 93.01 | 92.53 | 92.46 | 92.38 | 92.63 | 92.40 | 92.45 |
| $a_1^*$ | −3.41 | −2.34 | −3.15 | −2.52 | −2.76 | −3.13 | −1.64 | −2.30 |
| $b_1^*$ | 6.35 | 6.82 | 7.21 | 6.54 | 6.41 | 9.58 | 9.85 | 7.35 |
| $L_2$ | 91.57 | 91.71 | 90.45 | 91.36 | 91.43 | 91.46 | 92.15 | 89.09 |
| $a_2^*$ | −3.93 | −3.25 | −3.48 | −3.16 | −3.42 | −4.36 | −3.49 | −2.31 |
| $b_2^*$ | 11.73 | 13.88 | 14.14 | 12.42 | 12.17 | 17.91 | 18.09 | 15.46 |
| $\Delta L$ | −0.84 | −1.3 | −2.08 | −1.1 | −0.95 | −1.17 | −0.25 | −3.36 |
| $\Delta a$ | −0.52 | −0.91 | −0.33 | −0.64 | −0.66 | −1.23 | −1.85 | −0.01 |
| $\Delta b$ | 5.38 | 7.06 | 6.93 | 5.88 | 5.76 | 8.33 | 8.24 | 8.11 |
| $\Delta E$ | 5.47 | 7.24 | 7.24 | 6.02 | 5.88 | 8.50 | 8.45 | 8.78 |

From the results of $\Delta E$ of Examples 1C to 5C in comparison with those of Comparative Examples 1C to 3C, $\Delta E$ of the amino resin coating layers of Examples 1C to 5C before and after aging test were all controlled under 7.5; on the other hand, $\Delta E$ of the amino resin coating layers of Comparative Examples 1C to 3C before and after aging test were all over 8, more particularly, $\Delta E$ of the coating layer of Comparative Example 3C was as high as 8.78. Therefore, the amino resin coating layers of Comparative Examples 1C to 3C incurred obvious color change after aging while color change of the amino resin coating layers of Examples 1C to 5C was effectively mitigated and/or prevented by means of adopting the amino resin compositions of Examples 1 to 5, so that $\Delta E$ could be reduced as much as possible.

It can be seen that the varnishes prepared by using the amino resin compositions of Examples 1 to 5 were surely able to mitigate and/or prevent the yellowing or overall color change of the amino resin coating layers as much as possible, so as to improve the color stability of the amino resin coating layers on wood substrates as well as optimize appearance, durability, stability and industrial value of wood products.

Discussion on Results of Test Examples

The results of Test Examples 1 to 7 were all considered. From the results of $^{13}$C-NMR analysis, the integral values of the second characteristic peaks of the amino resin compositions of Examples 1 to 5 were obviously lower than those of the second characteristic peaks of the amino resin compositions of Comparative Examples 1 to 3, indicating that the impurity content in the amino resin compositions of Examples 1 to 5 was obviously lower than that of the amino resin compositions of Comparative Examples 1 to 3. Therefore, the varnish (Examples 1A to 5A) prepared from the amino resin compositions of Examples 1 to 5 had good storage stability, furthermore, the amino resin coating layers of Examples 1B to 5B or Examples 1C to 5C also had the merits of high hardness, rapid drying speed, high gloss and improved color stability.

On the contrary, as amino resin compositions of Comparative Examples 1 to 3 contained relatively more impurities, their properties were different from those of Examples 1 to 5, and the amino resin coating layers of Comparative Examples 1B to 3B or Comparative Examples 1C to 3C were all inferior to the amino resin coating layers formed by amino resin compositions of Examples 1 to 5 with regard to hardness, drying speed, gloss or color stability.

In summary, the amino resin composition, which has controlled integral values of the first and second characteristic peaks in its $^{13}$C-NMR spectrum, is able to take advantages of high hardness, rapid drying speed, high gloss and good color stability on the amino resin coating layers and amino resin products both prepared by curing the varnish, so as to optimize their production efficiency, appearance, durability and operability. As a result, the industrial values of the amino resin coating layers and amino resin products are overall improved, making them widely applicable to various applications.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An amino resin composition comprising a repeating unit represented by the following Formula (I):

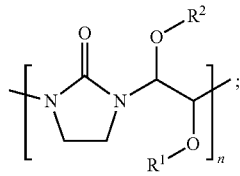

Formula (I)

wherein $R^1$ and $R^2$ are each independently a hydrogen atom or a C1 to C6 alkyl group, and n is an integer from 1 to 15;
wherein a $^{13}$C-NMR spectrum of the amino resin composition has a first characteristic peak at 159 ppm to 161 ppm and a second characteristic peak at 70 ppm to 80 ppm, and an integral value of the second characteristic peak is in the range from 0.01 to 0.25 based on an integral value of the first characteristic peak as 1.

2. The amino resin composition as claimed in claim 1, wherein the integral value of the second characteristic peak is in the range from 0.01 to 0.20.

3. The amino resin composition as claimed in claim 1, wherein the $^{13}$C-NMR spectrum of the amino resin composition has a third characteristic peak located at 54 ppm to 58 ppm and a fourth characteristic peak located at 65 ppm to 69 ppm, and a ratio of an integral value of the third characteristic peak to an integral value of the fourth characteristic peak is in the range from 0.20 to 0.60.

4. The amino resin composition as claimed in claim 1, wherein a viscosity of the amino resin composition is more than or equal to 560 cps at 25° C.

5. The amino resin composition as claimed in claim 4, wherein the viscosity of the amino resin composition is more than or equal to 560 cps and less than or equal to 800 cps tested at 25° C.

6. The amino resin composition as claimed in claim 1, wherein a non-volatile content of the amino resin composition is in the range from 53 wt % to 70 wt %.

7. The amino resin composition as claimed in claim 6, wherein the non-volatile content of the amino resin composition is in the range from 65 wt % to 70 wt %.

8. The amino resin composition as claimed in claim 1, wherein the second characteristic peak is located at 73 ppm to 77 ppm.

9. The amino resin composition as claimed in claim 1, wherein the APHA color of the amino resin composition is more than or equal to 120 and less than or equal to 260.

10. The amino resin composition as claimed in claim 9, wherein the APHA color of the amino resin composition is more than or equal to 150 and less than or equal to 200.

11. A varnish comprising the amino resin composition as claimed in claim 1.

12. The varnish as claimed in claim 11, wherein the varnish comprises a binder resin, a catalyst and a solvent.

13. The varnish as claimed in claim 12, wherein based on a total weight of the varnish, an amount of the amino resin composition is from 20 wt % to 60 wt %, an amount of the binder resin is from 15 wt % to 45 wt %, an amount of the catalyst is from 1 wt % to 20 wt %, and an amount of the solvent is from 10 wt % to 50 wt %.

14. An amino resin coating layer, which is formed by curing the varnish as claimed in claim 11.

15. The amino resin coating layer as claimed in claim 14, wherein the varnish comprises a binder resin, a catalyst and a solvent, wherein based on a total weight of the varnish, an amount of the amino resin composition is from 20 wt % to 60 wt %, an amount of the binder resin is from 15 wt % to 45 wt %, an amount of the catalyst is from 1 wt % to 20 wt %, and an amount of the solvent is from 10 wt % to 50 wt %.

16. The amino resin coating layer as claimed in claim 14, wherein the hardness on the Pencil Hardness Scale of the amino resin coating layer is 1H or higher.

17. The amino resin coating layer as claimed in claim 14, wherein a 60° gloss of the amino resin coating layer is more than 93 gloss units (GU).

18. The amino resin coating layer as claimed in claim 17, wherein the 60° gloss of the amino resin coating layer is in the range from 95 GU to 98 GU.

19. An amino resin product, which is prepared by coating and curing the varnish as claimed in claim 11 on a substrate.

20. The amino resin product as claimed in claim 19, wherein the substrate is a wood substrate, a paper substrate, a textile substrate, a leather substrate, a glass substrate, a plastic substrate, a metal substrate or any combination thereof.

* * * * *